(12) United States Patent
Choromanski et al.

(10) Patent No.: US 10,555,543 B2
(45) Date of Patent: Feb. 11, 2020

(54) CONFECTIONERY PRODUCTS WITH PEA PROTEINS

(75) Inventors: Pierre Choromanski, Roubaix (FR); Elsa Muller, Gonnehem (FR); Thomas Parady, Batavia, IL (US)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 13/576,456

(22) PCT Filed: Feb. 3, 2011

(86) PCT No.: PCT/FR2011/050213
§ 371 (c)(1),
(2), (4) Date: Aug. 1, 2012

(87) PCT Pub. No.: WO2011/095740
PCT Pub. Date: Aug. 11, 2011

(65) Prior Publication Data
US 2012/0294986 A1    Nov. 22, 2012

(30) Foreign Application Priority Data
Feb. 3, 2010  (FR) ..................... 10 50740

(51) Int. Cl.
*A23G 1/44* (2006.01)
*A23G 3/32* (2006.01)
*A23G 3/44* (2006.01)
*A23G 1/54* (2006.01)

(52) U.S. Cl.
CPC ............. *A23G 1/44* (2013.01); *A23G 3/32* (2013.01); *A23G 3/44* (2013.01); *A23G 1/54* (2013.01)

(58) Field of Classification Search
CPC ........ A23V 2002/00; A23G 1/54; A23G 1/44; A23G 3/32; A23G 3/44; A23P 1/02
USPC ......................... 426/660, 661, 656
See application file for complete search history.

(56) References Cited

U.S. PATENT DOCUMENTS

| | | | | |
|---|---|---|---|---|
| 3,543,696 | A * | 12/1970 | Posdal | A23G 3/0205 426/519 |
| 4,056,640 | A * | 11/1977 | Otto | A23G 3/32 426/573 |
| 6,056,949 | A | 5/2000 | Menzi et al. | |
| 6,630,586 | B1 | 10/2003 | Fouache et al. | |
| 6,777,016 | B2 * | 8/2004 | Thresher | 426/578 |
| 2004/0142093 | A1 | 7/2004 | Jones | |
| 2005/0136170 | A1 | 6/2005 | Grebenkamper et al. | |
| 2005/0191390 | A1 | 9/2005 | Krochta et al. | |
| 2005/0226960 | A1 * | 10/2005 | Boice et al. | 426/72 |
| 2006/0078593 | A1 * | 4/2006 | Strozier | A23L 1/0526 424/439 |
| 2006/0159805 | A1 | 7/2006 | Funda et al. | |
| 2006/0188644 | A1 | 8/2006 | Sault et al. | |
| 2008/0075808 | A1 * | 3/2008 | Altemueller | A23J 3/08 426/72 |
| 2009/0123629 | A1 | 5/2009 | Chang et al. | |
| 2009/0226542 | A1 | 9/2009 | Cresta | |
| 2011/0305740 | A1 | 12/2011 | Boursier et al. | |
| 2011/0311599 | A1 | 12/2011 | Boursier et al. | |
| 2012/0015078 | A1 | 1/2012 | Boursier et al. | |

FOREIGN PATENT DOCUMENTS

| | | | |
|---|---|---|---|
| CN | 1717184 | A | 1/2006 |
| CN | 1822770 | A | 8/2006 |
| JP | 2000169502 | A | 6/2000 |
| JP | 2003520039 | A | 7/2003 |
| JP | 2006271279 | A | 10/2006 |
| JP | 2007515177 | A | 6/2007 |
| JP | 2008200031 | A | 9/2008 |
| JP | 2008263944 | A | 11/2008 |
| JP | 2009124979 | A | 6/2009 |
| JP | 2010535029 | A | 11/2010 |
| JP | 2012519011 | A | 8/2012 |
| JP | 2012519012 | A | 8/2012 |
| WO | 9325616 | A1 | 12/1993 |
| WO | 01/52670 | | 7/2001 |
| WO | 0152670 | A1 | 7/2001 |
| WO | 2004032653 | A1 | 4/2004 |
| WO | 2005/089255 | | 9/2005 |
| WO | WO 2005089255 A2 * | 9/2005 | ........... A23G 3/2007 |
| WO | 2006083784 | A1 | 8/2006 |
| WO | 2007116819 | A1 | 10/2007 |
| WO | 2009/001063 | | 12/2008 |
| WO | 2008157629 | A1 | 12/2008 |
| WO | 2009101521 | A2 | 8/2009 |
| WO | 2010100370 | A1 | 9/2010 |

OTHER PUBLICATIONS

Definition of Confection Google search, Apr. 6, 2015, pp. 2.*
Pulse flour brochure from www.pealentil.com, 10 pages—Mar. 2014.*
https://www.caloriecount.com/ Green pea flour—Jan. 27, 2017—2 pages.*
Chinese Office Action, dated Mar. 27, 2013, from corresponding CN application.
International search report dated Oct. 25, 2011 in corresponding PCT/FR2011/050213.

(Continued)

*Primary Examiner* — Jyoti Chawla

(57) ABSTRACT

The present invention relates to the use of pea proteins to substitute at least partially the milk proteins in confectionery traditionally made with milk. It also relates to the confectionery product obtained after this substitution.

11 Claims, No Drawings

(56) References Cited

OTHER PUBLICATIONS

Nunes M C et al., "Gelled vegetable desserts containing pea protein, [kappa]—carrageenan and starch", European Food Research and Technology; Zeitschrift Fur Lebensmitteluntersuchung UNO—Forschung A, Springer, Berlin, DE LNKO—D0I:10.1007/S00217-005-0170-3, vol. 222, No. 5-6, Mar. 1, 2006 (Mar. 1, 2006), pp. 622-628, XP019328323, ISSN : 1438-2385 table 2.

Chan A S M et al., "A non-dairy frozen dessert utilizing pea protein isolate and hydrogenated canola oil." Food Technology 1992 Dep. of Fooo Sci., Univ. of Manitoba, Winnipeg, Man. R3T 2N2, Canada, vol. 46, No. 1, 1992, p. 88, XP009138842, "Processing of the Mixes"; p. 88, right-hand column "Most Acceptable Formulation"; pp. 91-92.

Database GNPD Mintel Caramel Bar Jun. 2006.
Database GNPD Mintel Caramel Bars Jan. 2006.
Database GNPD Mintel Chocolate Fudge Bar Jan. 2004.
Database GNPD Mintel Crunchy Chocolates Assortment Jan. 2010.
Database GNPD Mintel Milk Chocolate Meal Replacement Bars Jan. 2010.
Database GNPD Mintel Peanut Fudge Granola Bar Oct. 2007.
Database GNPD Mintel Protein Bar with Dark Chocolate Apr. 2007.
English translation of Japanese Office Action, dated Jun. 9, 2014, from corresponding JP application.
"Caramels, Toffes and Fudge", Sugar Confectionery and Chocolate Manufacture, pp. 191-193.
"Crunchy Pralines Assortment", Mintel, 2010, pp. 1-3.
"Pea Isolate the Protein Alternative", 2009, www.nutraceuticalmag.com, NBT promotion.
Pure Advantage Pea Protein Dietary Supplement, marketed as of Jan. 2006.
Proteine de Pois: Substitut Economique Clean Label, Aromes Ingredients Additifs, vol. 74, p. 17, Feb./Mar. 2008; mentioned on pp. 1, 5 and 6 of the European Notification.
European Notification, dated Sep. 30, 2013, from corresponding EP application.

* cited by examiner

CONFECTIONERY PRODUCTS WITH PEA PROTEINS

TECHNICAL FIELD OF THE INVENTION

The present invention relates to the use of pea proteins to substitute at least partially the milk proteins in confectionery traditionally made with milk. It also relates to the confectionery obtained after this substitution.

PRIOR ART

There are numerous confectionery products. They all have in common the cooking of sugar and mixing thereof with other ingredients to obtain various specialities and flavours. "Confectionery traditionally made with milk" comprises all confectionery products traditionally containing sugar and at least some milk proteins. This applies notably to soft or hard caramels, toffees, fudges, milk candies, crumbs, cooked milk fillings for confectionery, milk fat fillings, sweet sauces cooked with milk for coulis or toppings, milk jams, milk-based spreads, white chocolate or milk chocolate and products derived from white chocolates or milk chocolates, for example ganaches, pralines, couverture chocolates, bars, candies, bouchées, truffles, lentils, sprinkles and white-chocolate or milk-chocolate fillings (liquid, pasty, solid, as powder etc.).

In general, milk confectionery products are obtained from a mixture of milk proteins (caseins and whey proteins) with reducing carbohydrates (sugars and glucose syrup) and fats (vegetable and/or animal), said mixture being heated. The heating temperature depends on the type of confectionery desired. Typically, white chocolate or milk chocolate and products derived from white chocolate or milk chocolate are heated to a temperature between 40° C. and 80° C., whereas other confectionery, such as soft or hard caramels, toffees, or fudges, are heated to a temperature between 80° C. and 150° C. During this heating stage, the milk proteins react with the other ingredients and in particular with the reducing carbohydrates to give in the end a mass with the colour, texture and flavour typical of caramel or of toffee. The texture and the firmness of these traditional products are determined by the final cooking temperatures, whereas the flavour and the colour are due to the specificity of the ingredients used and the order of adding said ingredients to the mixture.

In all the confectionery products traditionally made with milk to which the present invention relates, milk is therefore typically the indispensable complement of the carbohydrates. Its role is technologically very important, notably as it makes it possible to develop, during cooking, the particular inimitable taste that milk acquires when it is cooked in the presence of sugars. This phenomenon is particularly well known under the name of Maillard reaction.

The Maillard reaction is a complex chemical reaction of browning, in which active groups of the reducing carbohydrates and of the amino acids of the proteins react with one another to give rise to polymerization products, the melanoidins, which give caramel its colour and its typical taste.

Although the presence of milk proteins is indispensable for development of the intensity of colour and taste in confectionery traditionally containing milk, their presence can also cause problems of allergies. Indeed the animal proteins from milk can be allergenic, causing reactions that are very troublesome, or even dangerous in everyday life.

Allergy to milk products is one of the commonest allergic reactions. Studies demonstrate that 65% of persons who suffer from food allergies are allergic to milk. The adult form of allergy to milk, called here "allergy to milk products", is a reaction of the immune system, which produces antibodies to fight the undesirable foodstuff. This allergy is different from the allergy to the proteins in cow's milk (bovine proteins), which affects newborn children and infants. Allergy to milk products causes varied symptoms such as constipation, diarrhoea, flatulence, eczema, urticaria, nausea, migraines, infections, abdominal cramps, nasal congestion and even severe asthma attacks. Persons who are allergic must completely eliminate milk, milk products and their derivatives from their diet.

Another major problem connected with milk proteins is their cost, which is continuing to increase. The application of milk quotas has caused on the one hand a dramatic reduction in the quantities of milk proteins available for the manufacture of food products and on the other hand considerable fluctuations in their prices.

Finally, by replacing milk proteins, which are of animal origin, in a traditional milk-based confectionery, said confectionery finally obtained can also be consumed by vegetarians who do not wish to eat animal proteins, of any origin and in any form.

In view of all the disadvantages, economic, environmental and nutritional, associated with the consumption of milk proteins, there is therefore considerable interest in the use of substitute proteins.

However, this substitution is not obvious, as milk proteins play an essential role in the taste, colour, firmness, chewability and storage stability of said confectionery products. Past attempts of substitution of the milk proteins in confectionery traditionally made with milk were not always very successful.

Patent application US 2006/0188644 describes good results in replacing milk proteins with wheat proteins in a caramel. However, this solution is not satisfactory, as wheat proteins are, like milk proteins, highly allergenic.

SUMMARY OF THE INVENTION

It is the merit of the applicant of having discovered that pea proteins could, surprisingly, advantageously replace milk proteins in confectionery products traditionally made with milk, while maintaining organoleptic, and in particular gustatory, olfactory, visual and tactile, qualities that are at least equivalent, or even better, than those of traditional confectionery products containing milk.

The present invention relates to the use of pea proteins for substituting milk proteins in confectionery products traditionally made with milk. Despite this substitution, the confectionery still has a flavour and palatability at least similar, or even improved, relative to confectionery traditionally comprising milk proteins. The milk proteins can be substituted partly or wholly.

The present invention also relates to confectionery traditionally made with milk comprising 0.5% to 30% of pea proteins, preferably 1% to 20%, even more preferably 2% to 16%, the percentages being expressed in dry weight, relative to the total dry weight of the confectionery.

Moreover, the present invention relates to a method of preparation of said confectionery products, said method comprising a stage consisting of cooking a confectionery preparation traditionally made with milk comprising pea proteins.

Finally, the present invention also relates to a composition consisting essentially of a mixture of pea proteins and reducing carbohydrates. This composition according to the invention is intended to be applied on foodstuffs, in particular on dry biscuits, before being cooked.

The present invention therefore also comprises the method of glazing of foodstuffs, in particular of biscuits, pastries, croissants and similar products, or sweet or savoury tarts, comprising the stages consisting of applying, on a foodstuff, the composition of pea proteins and reducing carbohydrates according to the invention, then cooking said foodstuff. The present invention further comprises the glazed foodstuff that can be obtained by the method of glazing of foodstuffs according to the invention.

DETAILED DESCRIPTION

The present invention relates to the use of pea proteins as a substitute for milk proteins in confectionery products traditionally made with milk.

In the sense of the present invention, the expression "confectionery products traditionally made with milk" denotes all of the cooked confectionery products traditionally containing reducing carbohydrates and at least some milk proteins. In particular, confectionery products traditionally made with milk comprises soft or hard caramels, toffees, fudges, milk candies, crumbs, cooked milk fillings for confectionery, milk fat fillings, sweet sauces cooked with milk for coulis or toppings, milk jams, milk-based spreads, white chocolates or milk chocolates and products derived from white chocolate or milk chocolate, for example ganaches, pralines, couverture chocolates, bars, candies, bouchées, truffles, lentils, sprinkles and white-chocolate or milk-chocolate fillings (liquid, pasty, solid, as powder etc.). A distinction can be made between confectionery products traditionally made with milk that are heated to a temperature between 40° C. and 80° C., such as white chocolates or milk chocolates and products derived from white chocolate or milk chocolate, and that which are heated to a temperature between 80° C. and 150° C., such as soft or hard caramels, toffees and fudges. The confectionery products traditionally made with milk that are preferred in the present invention are white chocolates or milk chocolates, soft or hard caramels, toffees and fudges.

Examples of confectionery products traditionally made with milk are described in the work with the title "Guide technologique de la confiserie industrielle" (Technological guide to industrial confectionery), by Ph. Bryselbout and Y. Fabry, published by the Société d'Edition et de Promotion Agro-Alimentaires, Industrielles et Commerciales (SEPAIC), Vol. 1, 1984, ISBN 2-903-899-05-X.

The composition of caramels, toffees and fudges can vary widely depending on the required intensity of colour and taste as well as the texture. Generally, the residual moisture of these products varies between 3 and 10%, sucrose between 30 and 60%, invert sugar between 1 and 10%, glucose syrup (expressed as dry matter) between 20 and 50%, fats between 1 and 15%, lactose between 1 and 6% and milk proteins between 0.75 and 15%.

Technologically, these specialities can be classified in three main groups according to their residual moisture content and their texture. Hard caramels have a residual moisture of 3 to 4% and a hard, smooth texture, whereas soft caramels/toffees have a relative moisture from 7 to 10% and a soft, chewable texture, and fudges have a moisture content of 7 to 9% with a texture that is soft but short.

In regulatory terms, the appellations are dictated by the confectioner profession, as described below.

The designations "caramels (soft or hard)" and "toffees", whether or not accompanied by a qualifier, are reserved for confectionery products prepared by cooking sugar, glucose (or invert sugar), food fats (butyric fat, vegetable fat and/or animal fat) and milk proteins, the fats and the milk proteins having to be in proportions such that the finished product contains a minimum of 6% of fats and 6% of dry matter derived from milk.

The designations "milk caramels" and "milk toffees", whether or not accompanied by a qualifier, are reserved for toffees and caramels manufactured with whole milk, in proportions such that the finished product contains at least 6% of dry matter derived from milk, of which 25% (i.e. 1.5% of the finished product) comprises butyric fats.

The designations "butter caramels", "cream caramels", "butter toffees" and "cream toffees" are reserved for toffees and caramels prepared by cooking sugar, glucose (or invert sugar), milk, cream or butter following the rules governing milk products, the finished product having to contain at least 3% of butyric fats, to the exclusion of any other fats not derived from milk.

In the present application, the designation "caramel" relates both to the soft caramels and the hard caramels.

Although not mentioned in the texts of these regulations, it should also be considered that the designations "milk fudges", "butter fudges" and "cream fudges" imply observance of the aforementioned minimum percentages.

Furthermore, caramels and toffees tasting of fruits, mint and other specialities, whose content of dry matter derived from milk is below 6% or that do not contain milk products, whether or not aerated, must carry the statement "imitation caramels" and "imitation toffees".

Chocolate is a sugar confectionery produced from cocoa beans, which are cleaned, fermented, roasted, crushed and ground to produce cocoa paste. This cocoa paste is pressed to extract on the one hand the fat, also called cocoa butter, and on the other hand the press cakes, used in their turn in the manufacture of cocoa powder. The present invention only relates to milk chocolates and white chocolates, as dark chocolate does not contain milk proteins.

The basic constituents of milk chocolate are cocoa paste, cocoa butter, sugar and milk compounds in various forms: milk itself or compounds obtained from partial or total dehydration of whole milk or of partially or fully skimmed milk and optionally from cream, from partially or fully dehydrated cream, from butter or from butyric fat. It meets the following characteristics: not less than 25% and not more than 40% of total cocoa dry matter, not less than 2.5% of defatted cocoa, not less than 14% of total dry matter of milk origin, not less than 3.5% of butyric fat, not less than 25% of total fats and not more than 55% of sugars. There are also additions of lecithin and sometimes of flavours.

White chocolate is constituted of cocoa butter, milk and sugar and optionally of flavours and lecithin. It does not contain cocoa paste.

The manufacture of white chocolate and of milk chocolate involves mixing the various ingredients in a kneader at a temperature close to 50° C., followed by fine grinding, which gives chocolate its fineness, conching and tempering. Conching is still currently a very important stage in chocolate manufacture. Among other things it gives a decrease in the water content of the paste and promotes the formation of aromatic compounds resulting from the Maillard reaction, said compounds endowing the chocolate with particular sensory properties. Tempering consists of bringing the cocoa butter to its most stable crystalline form and gives chocolate a smooth, shiny appearance, hardness and characteristic melting properties, as well as a longer shelf life.

In a particular method commonly employed, producing a milk chocolate with a caramelized, fruity and non-milky flavour that is much appreciated by consumers, the raw chocolate mixture is constituted of "crumb", sugar and cocoa butter. The crumb is prepared by thermal treatment of milk in liquid or concentrated form, adding sugar to it, concentrating under vacuum, mixing the sugar-containing concentrated milk and optionally cocoa paste (depending on whether we wish to prepare crumb for milk chocolate or for white chocolate), followed by complete drying of this mixture under vacuum, i.e. with a residual water content of maximum 1.5% by weight. The crumb is in the form of a hard dark mass, which is ground finely, put in moisture-proof bags and stored in a dry temperate room. This mass keeps for a long time and develops a typical flavour of crumb with a milky note after several months of storage, produced by enzymatic autolipolysis. This crumb can be used as an intermediate in the manufacture of milk chocolate and white chocolate. In this case, the crumb is mixed with other ingredients such as cocoa butter or cocoa paste (for milk chocolate) before fine grinding, conching and tempering.

Ganache is a thick chocolate preparation used as a filling for confectionery or pastry. In its simplest form, ganache is a mixture of cream (or sometimes milk or butter, or even a mixture of all three) and chocolate, generally in roughly equal amounts. It is obtained by pouring the boiled liquid onto the chocolate, while stirring gently with small concentric oscillations. On cooling, the mass acquires a thick or even a solid texture. The recipe varies depending on its use: the more chocolate there is relative to cream, the more solid is the ganache.

Milk fat fillings are all the mixtures obtained from sugar and vegetable and/or animal fats, which traditionally contain milk proteins and are intended to be used as filling in confectionery, pastries, bakery products, biscuits and any other food fields. Some examples are praline fat fillings, imitation "chocolate" fat fillings.

Milk preserve is an old culinary speciality without any real origin. It is a mixture of milk and sugar (300 to 500 g to one litre of milk) that is brought to the boil, then cooked on a very gentle heat for a good two hours until it thickens and has a caramel colour.

Generally, these various confectionery products can also contain various elements intended either for improving quality, or for flavouring, such as:
  nuts, such as almonds, hazelnuts, walnuts, pistachios, pecans, pine nuts, peanuts etc.,
  candied fruits, which are fruits cooked in sugar syrup to which honey or more generally glucose is added to prevent crystallization; they are notably apricots, pears, plums, cherries, pineapples, peel of citrus fruits etc.,
  fruits that have been dried or otherwise processed (pressed, concentrated, powdered); they are for example dried papaya in cubes, chopped dried fruits, freeze-dried apricots, pineapple pieces, raisins etc.,
  as well as fruit purées, fruit pulps, flavourings, chocolate, coffee, vanilla, salt.

In the present invention, the term "reducing carbohydrate" refers to carbohydrates whose carbon 1 bearing the hemiacetal hydroxyl group is not involved in a bond (the hemiacetal function is therefore free). In particular, glucose, arabinose, xylose, mannose, galactose, dextrose, fructose, lactose and maltose are reducing carbohydrates.

In the present invention, the term "pea" is considered in its broadest sense and includes in particular:
  all wild varieties of smooth pea and wrinkled pea, and
  all mutant varieties of smooth pea and of wrinkled pea, for example those described in the article by C-L Heydley et al. entitled "Developing novel pea starches" Proceedings of the Symposium of the Industrial Biochemistry and Biotechnology Group of the Biochemical Society, 1996, pp. 77-87.

Pea proteins are constituted, like all proteins of leguminous plants, of three main classes of proteins: the globulins, the albumins and the so-called "insoluble" proteins.

Pea proteins have a quite particular amino acid profile, different from that of milk proteins or of other vegetable proteins. The amino acid profile of pea proteins is in particular rich in:
  arginine, which plays an important role in physical effort and in maintenance of the immune system. Pea proteins contain more arginine than most of the other vegetable or animal proteins,
  lysine, which plays an important role in the growth of living beings, in particular in bone growth,
  branched-chain amino acids (isoleucine, leucine and valine), which help in the maintenance and (re)construction of muscle tissues,
  glutamine and glutamic acid, which are a source of energy for the muscles.

Despite the fact that pea proteins and milk proteins have very different compositions, the complete or partial replacement of milk proteins with pea proteins in confectionery products traditionally made with milk does not change the appearance, feel, odour, taste, or texture of said confectionery products.

In particular, chocolates produced containing pea proteins still have:
  in appearance: a smooth, shiny surface,
  to the sense of smell: a light, fruity and very pleasant odour,
  to the taste: a smoothness, a roundness in the mouth and a creamy aspect,
these characteristics being sought after and much appreciated by consumers of chocolate.

From the technological standpoint, this replacement of milk proteins with pea proteins does not significantly alter the rheological behaviour of the preparations that are used. Rheological behaviour can be quantified by two measurements: viscosity and yield point. In the food area of confectionery, the theoretical model generally used is Casson's model.

The behaviour of the confectionery products during their manufacture is not altered. Therefore it will not be necessary to modify the parameters of the manufacturing process.

A particular advantage of pea proteins is their absence of allergenicity. In addition, they have good emulsifying capacity, and a low cost, making them an economical functional ingredient.

The pea proteins according to the invention can be used for the manufacture of confectionery in the form of pea protein compositions. "Protein composition" means, in the sense of the present invention, a composition having a total protein content (N×6.25), expressed in grams of dry product, of at least 60% by weight of dry product.

To determine the total protein level, the soluble nitrogen-containing fraction contained in the sample is quantified according to the method of Dumas A., 1826, Annales de chimie, 33, 342, as cited by Buckee, 1994, in Journal of the Institute of Brewing, 100, pp 57-64, then the total protein level is obtained by multiplying the nitrogen content expressed as percentage by weight of dry product by the factor 6.25. This method, also known as the method of nitrogen analysis by combustion, consists of complete combustion of the organic matrix under oxygen. The gases produced are reduced by copper, then dried and the carbon dioxide is trapped. The nitrogen is then quantified by means of a universal detector. This method is well known by a person skilled in the art.

Preferably, within the scope of the present invention, a pea protein composition is used that has a high protein content between 55% and 99% by weight of dry product, even more preferably between 76% and 95%, and in particular between 78% and 92%.

The pea protein compositions that can be used according to the invention can be "pea protein concentrates" or "pea protein isolates". The pea protein concentrates and isolates are defined with respect to their protein content (cf. the 1983 review by J. Gueguen in *Proceedings of European congress on plant proteins for human food* (3-4) pp 267-304):

pea protein concentrates are described as having a total protein content from 60 to 75% of dry matter, and pea protein isolates are described as having a total protein content of 90 to 95% of dry matter, the protein contents being measured by the Dumas method (cf. reference above), the nitrogen content being multiplied by a factor of 6.25.

In another embodiment of the present invention, the pea protein compositions that can be used can also be "pea protein hydrolysates". The pea protein hydrolysates are defined as preparations obtained by enzymatic hydrolysis, by chemical hydrolysis, or by both routes simultaneously or successively, of pea proteins. The protein hydrolysates are composed of a mixture of peptides of different sizes and of free amino acids. This hydrolysis can affect the solubility of the proteins. Enzymatic and/or chemical hydrolysis is for example described in patent application WO 2008/001183.

The methods of preparation of protein hydrolysates are well known by a person skilled in the art and can for example comprise the following stages: dispersion of the proteins in water to obtain a suspension, hydrolysis of this suspension by the chosen treatment. Most often, it will be an enzymatic treatment combining a mixture of different proteases, optionally followed by a thermal treatment intended to inactivate the enzymes that are still active. The solution obtained can then be filtered on one or more membranes so as to separate the insoluble compounds, optionally the residual enzyme and the high molecular weight peptides (above 10 000 daltons).

According to an optional embodiment of the invention, the pea protein compositions previously described (concentrates, isolates, hydrolysates) can also undergo a thermal treatment at high temperature and for a short time in order to reduce the bacteriological risks, said treatment being selected from HTST (High Temperature Short Time) and UHT (Ultra High Temperature) treatments.

Preferably, the pea protein composition used according to the invention has a soluble protein content, expressed according to test A for measurement of the water solubility of proteins, between 20 and 99%, more preferably between 45 and 90%, even more preferably between 50 and 86%, and in particular between 55 and 75%.

Test A for determining the level of soluble proteins is as follows: Put 200.0 g of distilled water at 20° C.+/−2° C., with pH adjusted to 7.5+/−0.1, in a 400-ml beaker, and switch on magnetic stirring (magnetic bar, rotation at 200 rpm). Add exactly 5 g of the sample to be analysed. Stir for 30 min, and centrifuge for 15 min at 4000 rpm. Measure, on the supernatant, the content of water-soluble proteins according to the Dumas method already mentioned.

Moreover, these pea protein compositions used according to the invention preferably have a profile of molecular weight distribution comprising:

1% to 8%, preferably from 1.5% to 4% of proteins of more than 100000 daltons,

20% to 55%, preferably from 25% to 55% of proteins of more than 15000 and of at most 100000 daltons, 15% to 30% of proteins of more than 5000 and of at most 15000 daltons, and 25% to 55%, preferably from 25% to 50% of proteins of at most 5000 Da.

The molecular weights of the proteins constituting said pea protein compositions are determined by size-exclusion chromatography in denaturing conditions (SDS+2-mercaptoethanol); separation takes place according to the size of the molecules to be separated, the larger molecules being eluted first.

Examples of pea protein compositions according to the invention, as well as the details of the method of molecular weight determination, can be found in the applicant's patent application WO 2007/017572.

According to another optional embodiment of the present invention, the pea proteins used as a substitute for milk proteins are provided in the form of a vegetable milk.

In the present application, the name "vegetable milk" is used and concerns a drink which is not derived from milk of animal origin, and more particularly from cow's milk.

In a preferred embodiment of the present invention, said vegetable milk is prepared with a pea protein composition as described above, and contains only vegetable ingredients.

In a second preferred embodiment of the present invention, said vegetable milk used comprises an aqueous solution of a pea protein composition and of at least one starch hydrolysate.

In another preferred embodiment of the present invention, the pea proteins used as a substitute for milk proteins are provided in the form of a granulated vegetable milk powder which comprises at least one pea protein composition, preferably as described above, and at least one starch hydrolysate, and which is characterized in that it has a laser volume mean diameter D4, 3 of between 10 µm and 500 µm, preferably between 50 µm and 350 µm, and even more preferably between 70 µm and 250 µm, and a dry matter content, determined after oven drying at 130° C. for 2 hours, of greater than 80%, preferably greater than 85%, and even more preferably greater than 90%.

Moreover, said granulated powder is preferably characterized in that the weight ratio of the pea protein to the starch hydrolysate is between 99:1 and 1:99, preferably between 80:20 and 20:80, even more preferably between 65:35 and 35:65, and in particular between 55:45 and 45:55. Finally, said granulated powder is preferably characterized in that the sum of the amounts of pea protein and of starch hydrolysate is between 30% and 100%, and preferably between 50% and 100%, of the total mass of said granulated powder (dry/dry).

When the pea proteins are provided in the form of a vegetable milk, said vegetable milk is preferably obtained by dissolving said vegetable milk powder described above in any drinkable liquid intended for human consumption, and preferably characterized in that the rate of dissolution of the granulated vegetable milk powder is between 2% and 30% by dry weight, preferably between 2% and 20%, even more preferably between 3% and 15%, and in particular between 5% and 10%.

In the present application, the term "starch hydrolysate" denotes any product obtained by acid or enzymatic hydrolysis of legume, cereal or tuber starch. Various methods of hydrolysis are known and have been described generally on pages 511 and 512 of the book entitled Encyclopedia of Chemical Technology, 3rd Edition, Vol. 22, 1978 by Kirk-Othmer. These hydrolysis products are also defined as purified and concentrated mixtures formed from linear chains made up of units of D-glucose and polymers of D-glucose which are essentially α(1→4)-linked with only 4% to 5% of α(1→6) branched glucosidic linkages, of extremely varied molecular weights, which are completely soluble in water. Starch hydrolysates are very well known and perfectly described in the Kirk-Othmer Encyclopedia of Chemical Technology, 3rd Edition, Vol. 22, 1978, pp. 499 to 521.

Thus, in the present invention, the starch hydrolysis product is chosen among maltodextrins, glucose syrups, dextrose (crystalline form of α-D-glucose) and any mixtures thereof.

The distinction between the starch hydrolysis products is based mainly on the measurement of their reducing power, conventionally expressed by the notion of Dextrose Equivalent or DE. The DE corresponds to the amount of reducing sugars, expressed as dextrose equivalent per 100 g of dry matter of the product. The DE therefore measures the intensity of the hydrolysis of the starch, since the more the product is hydrolyzed, the more small molecules (such as dextrose and maltose, for example) it contains and the higher its DE is. Conversely, the more large molecules (polysaccharides) the product contains, the lower its DE is.

From the regulatory point of view, and also for the purpose of the present invention, maltodextrins have a DE of between 1 and 20, and glucose syrups have a DE greater than 20.

Such products are, for example, the maltodextrins and the dehydrated glucose syrups marketed by the applicant under the name Glucidex® (DE available=1, 2, 6, 9, 12, 17, 19 for maltodextrins and DE=21, 29, 33, 38, 39, 40, 47 for glucose syrups). Mention may also be made of the glucose syrups marketed by the applicant under the name "Roquette sirops de glucose" [Roquette glucose syrups].

Examples of compositions of vegetable milk obtained by dissolving said granulated powder, and which are capable of totally or partially replacing milk products in a confectionery traditionally containing milk proteins, and also a method for obtaining such a vegetable milk, can be found in patent application WO 2010/100370 of which the applicant company is also the proprietor.

The present invention also relates to confectionery traditionally made with milk comprising 0.5% to 30% of pea proteins, preferably 1% to 20%, even more preferably 2% to 16%, the percentages being calculated by dry weight, relative to the total dry weight of the confectionery.

The confectionery according to the present invention preferably comprises less than 30% of milk proteins, preferably 0% to 20%, even more preferably 0% to 16%, the percentages being calculated by weight, relative to the total weight of the confectionery.

The contents of milk proteins and pea proteins can be measured by the Dumas method (cf. reference above), the nitrogen content being multiplied by a factor of 6.25.

The substitution of milk proteins with pea proteins can be partial or total. Preferably, the weight ratio (milk proteins)/(pea proteins) in the confectionery according to the present invention is between 0 and 2, preferably between 0 and 1, even more preferably between 0 and 0.5.

According to a preferred embodiment, the confectionery according to the present invention is free from milk proteins.

Moreover, the present invention relates to a method of preparation of confectionery products that are also objects of the present invention. This method comprises the stage consisting of cooking a confectionery preparation traditionally made with milk comprising pea proteins. The proportion of pea proteins in said preparation is adjusted by a person skilled in the art so that the confectionery obtained after cooking comprises from 0.5% to 30% of pea proteins, preferably 1% to 20%, even more preferably 2% to 16%, the percentages being calculated by dry weight, relative to the total dry weight of the confectionery.

According to a preferred embodiment, the method according to the invention comprises the stage consisting of cooking a confectionery preparation traditionally made with milk comprising pea proteins, said preparation being free from milk proteins.

Classical recipes of confectionery products traditionally made with milk are known by a person skilled in the art. Reference may be made for example to the book entitled "Guide technologique de la confiserie industrielle" (Technological guide to industrial confectionery), by P. Bryselbout and Y. Fabry, published by the Société d'Edition et de Promotion Agro-Alimentaires, Industrielles et Commerciales (SEPAIC), Vol. 1, 1984, ISBN 2-902-899-05-X. The book entitled "Sugar Confectionery Recipes and Methods", by E. B. Jackson, published by Kennedys Publications, London, 2002, also contains numerous recipes of traditional milk-based confectionery.

According to one embodiment, the confectionery products according to the invention are prepared according to the conventional recipes, except that the milk proteins traditionally included in the recipe are replaced, at least partly, with pea proteins.

In the traditional recipes, the milk proteins can be supplied in the form of whole milk, semi-skimmed milk or skimmed milk, as powder or liquid. In this case, some or all of said milk can be replaced with pea proteins, making up for the protein part of the milk, and with carbohydrates, making up for the lactose contained in milk. Optionally, a fat can also be added to make up for the lipid part of the milk.

Finally, the present invention also relates to a composition consisting essentially of a mixture of pea proteins and reducing carbohydrates. This composition is intended to be used as glaze for foodstuffs.

The use of compositions for glazing foodstuffs is in fact known. These compositions are brushed onto the foodstuffs, then they are cooked to give an attractive golden colour.

The glazing compositions according to the present invention are those that traditionally contain at least some milk proteins and reducing carbohydrates. In one embodiment of the invention, the milk proteins in these glazing compositions are replaced partly or wholly with pea proteins.

The composition of pea proteins and reducing carbohydrates according to the invention is intended to be applied on foodstuffs before cooking. They can be savoury or sweet foods, and in particular they can be biscuits, pastries, pastries made with sweetened dough, or sweet or savoury tarts.

The present invention therefore also comprises the method of glazing of foodstuffs, in particular of biscuits, pastries, croissants and similar products, or sweet or savoury tarts, comprising the stages consisting of applying, on a foodstuff, the composition of pea proteins and reducing carbohydrates according to the invention, then cooking said foodstuff. As previously described in confectionery products, cooking of the composition leads to chemical reactions between reducing sugars and proteins, also called the Maillard reaction, causing in particular browning of the composition, and the development of a taste that is characteristic of caramel.

The present invention further comprises the glazed foodstuff that can be obtained by the method of glazing of foodstuffs according to the invention.

Said composition preferably comprises 0.1% to 60% of pea proteins, more preferably 5% to 40% of pea proteins, the percentages being calculated by dry weight, relative to the total dry weight of the glazing composition.

Said composition preferably also comprises 10% to 80% of reducing carbohydrates, more preferably 20% to 70% of reducing carbohydrates, the percentages being calculated by dry weight, relative to the total dry weight of the glazing composition.

The composition can optionally contain other ingredients such as egg proteins or vegetable and/or animal fats.

Moreover, preferably, the weight ratio (pea proteins)/(reducing carbohydrates) is between 0.25 and 4, preferably between 0.5 and 2, even more preferably between 0.75 and 1.25.

Said composition can be in powder form, anhydrous or not, or in liquid form.

The fraction of said composition according to the invention that is neither pea protein, nor reducing carbohydrates, can comprise, for example, one or more non-reducing sugar(s), one or more fat(s), one or more emulsifier(s), one or more preservative(s), one or more swelling agent(s), one or more foaming agent(s), one or more gelling agent(s), one or more acidifier(s), one or more aroma(s), one or more dye(s), or various elements intended either for improving quality, or for aromatizing the composition, for example dry fruits, candied fruits, fruits that have been dried or otherwise processed (pressed, concentrated, powdered), fruit purées, fruit pulps, chocolate, coffee, vanilla and salt.

The mixing of the pea proteins and sugar can be carried out by a person skilled in the art by all the known mixing techniques, both by batch processing and in a continuous system, in particular using paddle, screw, plough-blade or ribbon mixers. When a more intimate contact between the constituents is required, the techniques of granulation, extrusion and spraying can also be used.

Moreover, the confectionery traditionally made with milk comprising pea proteins according to the present invention can also comprise vegetable fibre.

In the present invention, the term "vegetable fibre" refers to soluble and/or insoluble edible vegetable fibres. In the present invention, vegetable fibre is selected from soluble fibres, insoluble fibres and any mixtures thereof.

According to a preferred embodiment of the present invention, the confectionery contains pea proteins and at least one soluble vegetable fibre.

"Soluble fibre" means water-soluble fibres. Fibre can be determined according to various AOAC methods. We may mention, for example, AOAC methods 997.08 and 999.03 for fructans, FOS and inulin, AOAC method 2000.11 for polydextrose, AOAC method 2001.03 for determining fibres contained in branched maltodextrins and indigestible dextrins or AOAC method 2001.02 for GOS as well as soluble oligosaccharides obtained from oleaginous or proteinaceous plants. Among the soluble oligosaccharides obtained from oleaginous or proteinaceous plants, we may mention the oligosaccharides from soya, colza or pea.

Preferably, said soluble fibre of vegetable origin is selected from the group comprising fructans, including fructo-oligosaccharides (FOS) and inulin, gluco-oligosaccharides (GOS), isomalto-oligosaccharides (IMOs), trans-galacto-oligosaccharides (TOS), pyrodextrins, polydextrose, branched maltodextrins, indigestible dextrins and soluble oligosaccharides obtained from oleaginous or proteinaceous plants.

According to a particularly advantageous embodiment of the present invention, the confectionery comprises pea proteins together with branched maltodextrins.

According to one embodiment of the present invention, the branched maltodextrins (BMDs) are the specific maltodextrins identical to those described in the applicant's patent EP 1,006,128-B1. These BMDs have the advantage to constitute a source of indigestible fibres that are beneficial to the metabolism and the intestinal balance. In particular, it will be possible to use BMDs having between 15 and 35% of glucosidic bonds 1-6, a content of reducing sugars below 20%, a weight-average molecular weight Mw between 4000 and 6000 g/mol and a number-average molecular weight Mn between 250 and 4500 g/mol. Preferably, the BMDs are high molecular weight BMDs having a content of reducing sugars of at most 5% and an Mn between 2000 and 4500 g/mol.

In the present application, the pyrodextrins denote the products obtained by heating starch to low moisture content, in the presence of acid or basic catalysts, and generally having a molecular weight between 1000 and 6000 daltons.

Polydextrose is a soluble fibre produced by thermal polymerization of dextrose, in the presence of sorbitol and acid as catalyst. An example of such a product is LITESSE® marketed by DANISCO.

An example of a particularly interesting combination with a vegetable protein is the use of NUTRIOSE®, which is a complete range of soluble fibres, with recognized benefits, and manufactured and marketed by the applicant. The products in the NUTRIOSE® range are partially hydrolysed derivatives of wheat starch or maize starch, which contain up to 85% of fibre. This high fibre content makes it possible to increase digestive tolerance, improve calorie management, prolong energy release and obtain a lower proportion of sugar. Moreover, the NUTRIOSE® range is one of the best tolerated fibres available on the market. It displays greater digestive tolerance, giving better incorporation than other fibres, which represents a real advantage for food products.

According to another advantageous embodiment of the invention, the confectionery contains pea proteins and at least one form of insoluble vegetable fibre.

Preferably, said insoluble vegetable fibre is selected from the group comprising resistant starches, fibres from cereals, fibres from fruits, fibres from vegetables, fibres from leguminous plants and mixtures thereof. We may mention for example fibres such as bamboo fibres, pea fibres or carrot fibres.

According to one variant, said confectionery contains pea proteins and fibre from a leguminous plant, preferably pea fibre.

According to another variant, said confectionery contains pea proteins and at least one insoluble vegetable fibre, and preferably a resistant starch. Use of natural resistant starches or resistant starches obtained by chemical, and/or physical, and/or enzymatic modification is equally possible.

According to the present invention, "resistant starch" means a starch or a starch fraction that is not digested in the small intestine and that is fermented by the bacteria in the colon.

According to another variant, said confectionery contains pea proteins and a mixture of at least one resistant starch and of pea fibre.

Preferably, a resistant starch obtained from starch having an amylose content above 50% will be used. The EURYLON® amylose-rich starches marketed by the applicant are particularly suitable.

According to another particularly advantageous embodiment of the invention, the confectionery contains pea proteins and a mixture of soluble and insoluble fibres.

Advantageously, the soluble fibres are branched maltodextrins when the insoluble fibres are selected from fibres of leguminous plants and resistant starches, or are a mixture of the two.

According to a particularly advantageous characteristic of the invention, said leguminous plant from which the fibres of leguminous plants and the proteins of leguminous plants are obtained is selected from the group comprising alfalfa, clover, lupin, pea, haricot bean, broad bean, field bean, lentil and mixtures thereof.

According to another advantage of the present invention, the total substitution of the milk proteins can be effected with a larger amount of pea proteins, and the confectionery obtained can then bear the statement "sources of proteins".

The invention will be understood even better on reading the examples given below, which are intended for purposes of illustration and only mention certain embodiments and certain advantageous properties according to the invention, but are not limiting.

EXAMPLES

Example 1: Total Substitution of the Milk Proteins in a Milk Chocolate

Control: Traditional Milk Chocolate

A traditional milk chocolate is made with the following ingredients:
Icing sugar: 0% of fat
Cocoa paste: 54% of fat
"Prochoc R26": ingredient marketed by the company INGREDIA at Arras (France), constituted of dried whole milk; 24.5% of proteins, 37.75% of lactose, 26% of fat,
Cocoa butter: 100% of fat
Lecithin: 100% of fat.
The recipe used is as follows:
1. Mixing of the ingredients in Table 1:

TABLE 1

| Ingredients | Ingredients by weight (g) | Composition (%) |
| --- | --- | --- |
| Icing sugar | 840 | 52.08 |
| Cocoa paste | 220 | 13.64 |
| Prochoc R26 | 450 | 27.90 |
| Cocoa butter | 103 | 6.38 |
| Total | 1613 | 100 |

2. Grinding (in three-roller mill): pressure of the rollers: 1st pass at 20-30 bar, 2nd pass at 35-45 bar, 3rd pass at 55-60 bar.
3. Conching: temperature 55° C., duration 20 h using the ingredients shown in Table 2:

TABLE 2

| Ingredients | Composition (g) |
| --- | --- |
| Mixture obtained following | 1613 |

TABLE 2-continued

| Ingredients | Composition (g) |
| --- | --- |
| the grinding stage | |
| Cocoa butter | 377 |
| Lecithin | 10 |
| Total | 2000 |

This recipe gives milk chocolate with the final composition as presented in Table 3:

TABLE 3

| | Composition (%) | Ingredients by weight (g) | Fat (%) | Calorific value (kcal) |
| --- | --- | --- | --- | --- |
| Icing sugar | 42 | 840 | 0.00 | 100.80 |
| Cocoa paste | 11 | 220 | 5.94 | 67.10 |
| Prochoc R26 | 22.5 | 450 | | |
| milk proteins | 5.5 | 110 | | |
| lactose | 8.5 | 170 | | |
| fat | 5.85 | 117 | 5.85 | 110.25 |
| Cocoa butter | 24 | 480 | 24.00 | 216.00 |
| Lecithin | 0.5 | 10 | 0.50 | 4.50 |
| Total | 100 | 2000 | 36.29 | 498.65 |

The residual moisture content of the control milk chocolate is negligible. Consequently, the control chocolate contains 5.5% of milk proteins by dry weight.

Test 1: Milk Chocolate with Pea Proteins

A milk chocolate is made from the traditional recipe of the control, in which the milk proteins are substituted completely with pea proteins. The ingredients used are the same, except:

Composition of pea proteins: 85% (dry) of pea proteins, "AMF": anhydrous milk fat; 100% of fat.

Prochoc R26 was omitted from the recipe. To make up for the lactose and fat originally supplied by Prochoc R26 in the control formulation, anhydrous milk fat (AMF) was added and the amount of icing sugar was adjusted.

The method of preparation is similar to that employed for making the control:
1. Mixing of the ingredients in Table 4:

TABLE 4

| Ingredients | Ingredients by weight (g) | Composition (%) |
| --- | --- | --- |
| Icing sugar | 911 | 56.48 |
| Cocoa paste | 220 | 13.64 |
| Composition of pea proteins | 262 | 16.24 |
| AMF | 117 | 7.25 |
| Cocoa butter | 103 | 6.39 |
| Total | 1613 | 689.91 |

2. Grinding (in three-roller mill): pressure of the rollers in bar: 1st pass at 20-30, 2nd pass at 35-45, 3rd pass at 55-60.
3. Conching: temperature 55° C., duration 20 h using the ingredients shown in Table 5:

TABLE 5

| Ingredients | Composition (g) |
| --- | --- |
| Mixture obtained following | 1613 |

TABLE 5-continued

| Ingredients | Composition (g) |
|---|---|
| the grinding stage | |
| Cocoa butter | 377 |
| Lecithin | 10 |
| Total | 2000 |

This recipe gives milk chocolate whose final composition is as described in Table 6:

TABLE 6

| | Composition (%) | Ingredients by weight (g) | Fat (%) | Calorific value (kcal) |
|---|---|---|---|---|
| Icing sugar | 45.55 | 911 | 0.00 | 109.32 |
| Cocoa paste | 11 | 220 | 5.94 | 67.10 |
| AMF | 5.85 | 117 | 5.85 | 52.65 |
| Composition of pea proteins | 13.1 | 262 | 0.00 | 52.40 |
| pea proteins | 11 | 220 | | |
| Cocoa butter | 24 | 480 | 24.00 | 216.00 |
| Lecithin | 0.5 | 10 | 0.50 | 4.50 |
| Total | 100 | 2000 | 36.39 | 501.97 |

The residual moisture content of the milk chocolate is negligible. Consequently, the milk chocolate in test 1 contains 11% of pea proteins by weight of dry product.

Comparative Measurements Between Test 1 and the Control

Rheological Measurements

Measurements of viscosity were performed at 40° C. on a Physica MCR 301 rheometer according to the standard applied by chocolate manufacturers (AIOCC standard).

Equipment used: Imposed shear rate rheometer (PHYSICA® MCR301-Anton Paar)
Geometry used: Coaxial rollers (34 mm outside diameter and 32 mm inside diameter)
Temperature: 40° C.
Pre-shear: 10 min at 5 s$^{-1}$
Increase in shear: 1 to 50 s$^{-1}$ in 3 min
Maintaining shear: 1 min at 50 s$^{-1}$
Decrease in shear: 50 to 1 s$^{-1}$ in 3 min
Results: Casson modelling of the return curve (decrease in shear).

| | Casson Viscosity (Pa · s) | Yield point (Pa) |
|---|---|---|
| Control milk chocolate | 1.5 | 6.8 |
| Test 1 total substitution of the milk proteins | 0.7 | 11.0 |

The differences observed between the values of Casson viscosity and yield point of the control and of test 1 are not significant. Total substitution of milk proteins with pea proteins therefore does not significantly alter the rheological behaviour of the chocolate.

Sensory Testing

The two samples of milk chocolate, the control with milk proteins and that only containing pea proteins as source of proteins, were tasted blind by a panel of experts in sensory testing of 25 persons.

The first test consisted of a triangular test in which, out of three samples offered, two were identical.

78% of the persons who took part in the test were unable to tell which were the two identical samples. None of the samples tested was given significant preference by the panel.

The second test, still blind, consisted of tasting the two samples and describing them. Tasting is an operation that consists of experiencing, analysing and assessing the organoleptic characteristics and more particularly the organo-olfactory characteristics of a product. Tasting involves the senses of sight, touch, smell and taste. For this tasting, the qualifiers used were identical for the two chocolates:

Test of observation: surface of the chocolate smooth, iridescent and slightly shiny;
Tactile test: surface smooth, hard.
Olfactory test: light, fruity, very pleasant odour.
Tasting test: smoothness, roundness in the mouth, creaminess.

These two series of tests for sensory analysis demonstrate perfectly that the trained panel was unable to tell the difference between a traditional milk chocolate and a chocolate no longer containing milk proteins but a pea protein composition according to the present invention. The benefit of the invention is therefore demonstrated.

This invention will notably enable persons who are allergic to milk proteins to enjoy chocolates that are as good and creamy as their equivalents containing milk proteins.

The present example also shows that protein enrichment is possible. Thus, the test chocolate has a higher content of proteins than the control chocolate, and the statement "source of proteins" can be shown on its packaging.

Example 2: Total Substitution of the Milk Proteins in a Milk Caramel

Control: Traditional Milk Caramel

A traditional milk caramel is made with the following ingredients:

Water,
Skimmed milk powder, marketed by the company IDI at Arras (France) constituted of 38% of proteins and 53% of carbohydrates, the remainder being fat and water.
Hydrogenated vegetable fat of the Biscuitine 621 type, marketed by the company LODERS CROKLAAN BV,
Glycerol monostearate,
Glucose of the A4280 S type, possessing a Dextrose Equivalent of 42, containing 20% of water and a low content of SO$_2$
Sugar,
NaCl.

The recipe used is as follows:

| Ingredients | Ingredients by weight (g) | Composition (%) |
|---|---|---|
| Water | 135 | 13.5 |
| Skimmed milk powder | 90 | 9 |
| Biscuitine 621 fat | 130 | 13 |
| Glycerol monostearate | 3 | 0.3 |
| Glucose | 420 | 42 |
| Sugar | 220 | 22 |
| Salt | 2 | 0.2 |
| Total | 1000 | 100 |

Procedure mix the skimmed milk with water and make sure there is good dispersion to avoid the formation of lumps.

Then add the rest of the ingredients, stirring continuously.
Gradually heat the mixture on a gentle heat, with stirring, until a temperature of 120° C. is reached.
Cast or mould.
Cool.
Wrap in foil.

This recipe gives hard caramels, whose final composition is as presented in Table 7.

TABLE 7

| Ingredients | Final composition (%) |
|---|---|
| Residual moisture | 7 |
| Skimmed milk powder | 10.7 |
| incl. milk proteins | 4 |
| Biscuitine 621 fat | 15.5 |
| Glycerol monostearate | 0.36 |
| Glucose | 40 |
| Sugar | 26.2 |
| Salt | 0.24 |
| Total | 100 |

With a residual water content of 7%, the control caramel contains 4.3% of milk proteins by weight of dry product.

Test 1: Milk Caramel with Pea Proteins

A milk caramel is made based on the traditional recipe of the control, in which the milk proteins were substituted completely with pea proteins. The ingredients employed are the same, except:
Composition of pea proteins: 85% (dry) of pea proteins.
The skimmed milk powder was omitted from the recipe. To make up for the lactose, fat and water originally supplied by this ingredient in the control formulation, fat of the Biscuitine fat type, sugar and water were therefore added to the basic ingredients.

The recipe used for this test is as follows:

| Ingredients | Ingredients by weight (g) | Composition (%) |
|---|---|---|
| Water | 139.5 | 13.9 |
| Composition of pea proteins | 36.9 | 3.7 |
| Biscuitine 621 fat | 130.9 | 13.1 |
| Glycerol monostearate | 3 | 0.3 |
| Glucose | 420 | 42 |
| Sugar | 267.7 | 26.8 |
| Salt | 2 | 0.2 |
| Total | 1000 | 100 |

The method of preparation is similar to that employed for making the control, as described above.

This recipe gives hard caramels, whose final composition is as shown in Table 8.

TABLE 8

| Ingredients | Final composition (%) |
|---|---|
| Residual water | 8.65 |
| Composition of pea proteins | 4.35 |
| incl. pea proteins | 3.7 |
| Biscuitine 621 fat | 15.4 |
| Glycerol monostearate | 0.35 |
| Glucose | 39.5 |
| Sugar | 31.5 |
| Salt | 0.25 |
| Total | 100 |

With a residual water content of 8.65%, the caramel from test 1 contains 4.1% of pea proteins by weight of dry product.

Sensory Testing

The two samples of caramel, the control with milk proteins and that only containing pea proteins as source of proteins, were tasted blind by a panel of experts in sensory testing of 25 persons, by the same tests as those described in Example 1 above.

The first test consisted of a triangular test in which, out of the three samples offered, two were identical.

81% of the persons who took part in the test were unable to tell which were the two identical samples. None of the samples tested was given significant preference by the panel.

The second test, still blind, consisted of tasting the two samples and describing them. For this tasting, the qualifiers used were identical for the two caramels:
Observation test: colour (depth of the brown coloration), surface of the caramel smooth and slightly shiny;
Tactile test: surface smooth, hard, pliable.
Olfactory test: light, buttery, milky, very pleasant odour.
Tasting: smoothness, roundness in the mouth, creaminess, on the milky side.

These two series of tests for sensory analysis demonstrate perfectly that the trained panel was unable to tell the difference between a traditional milk caramel and a caramel no longer containing milk proteins but a pea protein composition according to the present invention. The qualifier "milky" was even used for the caramel no longer containing milk proteins.

The benefit of the invention is therefore demonstrated.

Example 3: Total Substitution of the Milk Proteins in a Milk Caramel Using a Vegetable Milk Containing Pea Proteins Control: Traditional Milk Caramel A traditional milk caramel is made with the same ingredients as those used in Example 2, except the skimmed milk powder which differs by virtue of its composition and the NaCl, which is not present in this example.

The skimmed milk powder used in this example is marketed by the company IDI at Arras (France) and is constituted of 26% of proteins and 40% of carbohydrates, the remainder being fat and water (the percentages being expressed by weight on a dry basis).

The recipe used is as follows:

| Ingredients | Ingredients by weight (g) | Composition (%) |
|---|---|---|
| Water | 93 | 9.3 |
| Skimmed milk powder | 140 | 14 |
| Biscuitine 621 fat | 69.5 | 6.95 |
| Glycerol monostearate | 2.5 | 0.25 |
| Glucose | 417 | 41.7 |
| Sugar | 278 | 27.8 |
| Total | 1000 | 100 |

The Procedure Used is Identical to that Described for Example 2.

This recipe gives hard caramels, whose final composition is as described in Table 9.

TABLE 9

| Ingredients | Final composition (%) |
|---|---|
| Residual water | 9 |

TABLE 9-continued

| Ingredients | Final composition (%) |
|---|---|
| Skimmed milk powder | 5.1 |
| incl. milk proteins | 1.33 |
| Biscuitine 621 fat | 8.7 |
| Glycerol monostearate | 0.3 |
| Glucose | 42 |
| Sugar | 34.9 |
| Total | 100 |

Test 1: Milk Caramel with Pea Proteins

A milk caramel is made based on the traditional recipe of the control, in which the milk proteins were substituted completely with pea proteins, themselves provided by a vegetable milk.

A. Preparation of the Vegetable Milk

The vegetable milk is prepared according to the recipe below. The NUTRALYS® S pea protein composition used contains 85% of pea proteins, on a dry basis.

| | Composition used (g) | Dry (%) |
|---|---|---|
| NUTRALYS ® S pea proteins | 4.95 | 4.70 |
| GLUCIDEX ® 19 maltodextrin | 6.93 | 146.58 |
| Sunflower oil | 1.58 | 1.58 |
| Water | 86.54 | — |
| Total | 100 | 12.87 |

Procedure for Preparing the Vegetable Milk

The water was heated to 65° C.

The pea proteins and the GLUCIDEX® DE 19 maltodextrin were added to the water, and the whole mixture was left at ambient temperature for a minimum of 30 minutes in order to allow good hydration of the two added products.

The sunflower oil was gradually added to the above mixture, with stirring by means of a POLYTRON® mixer, at a speed of 4000 rpm. The stirring was maintained for 2 minutes.

The above mixture was then homogenized using a NIRO® Soavi (GEA group) homogenizer at a pressure of 250 bar.

The resulting emulsion was then sterilized on a mini-cooker with the motor mark set such that the vegetable milk has an exit temperature of between 135 and 140° C. The set temperature of the cooker was 190° C. and the motor mark was set on 3.5.

Nutritional information on the vegetable milk obtained

| Proteins/dry | 4% |
|---|---|
| Carbohydrates/dry | 6.73% |
| Lipids | 1.89% |

B. Preparation of the Confectionery Made with Vegetable Milk

A milk caramel is made based on the traditional recipe of the control, in which the milk proteins were substituted completely with pea proteins provided by the vegetable milk prepared as described above.

The water is provided by the pea milk.

The recipe used is as follows:

| Ingredients | Ingredients by weight (g) | Composition (%) |
|---|---|---|
| Water | 0 | — |
| Pea vegetable milk | 254.5 | 25.5 |
| Biscuitine 621 fat | 72.5 | 7.2 |
| Glycerol monostearate | 2.3 | 0.2 |
| Glucose | 402.3 | 40.2 |
| Sugar | 268.4 | 26.9 |
| Total | 1000 | 100 |

The preparation method is similar to that used to make the control and described above.

This recipe gives hard caramels, whose final composition is as described in Table 10.

TABLE 10

| Ingredients | Final composition (%) |
|---|---|
| Residual water | 9 |
| Vegetable milk | 4.3 |
| incl. pea proteins | 1.33 |
| Biscuitine 621 fat | 9.4 |
| Glycerol monostearate | 0.3 |
| Glucose | 42 |
| Sugar | 35 |
| Total | 100 |

C. Sensory Testing

The two samples of caramel, the control with milk proteins and that only containing pea proteins provided by a vegetable milk were tasted blind by a panel of experts in sensory testing of 25 persons, according to the same tests as those described in Example 1 of the present invention.

The first test consisted of a triangular test in which, out of the three samples offered, two were identical.

83% of the persons who took part in the test were unable to tell which were the two identical samples. None of the samples tested was given significant preference by the panel. The second test, still blind, consisted in tasting the two samples and describing them. For this tasting, the qualifiers used were identical for the two caramels:

Test of observation: color (depth of the brown coloration), surface of the caramel smooth and slightly shiny;

Tactile test: surface smooth, hard, pliable.

Olfactory test: light, buttery, milky, very pleasant odor.

Tasting test: smoothness, roundness in the mouth, creaminess, on the milky side.

These two series of tests for sensory analysis demonstrate perfectly that the trained panel was unable to tell the difference between a traditional milk caramel and a caramel no longer containing milk proteins but a pea protein composition provided by a vegetable milk according to the present invention. The qualifier "milky" was even used for the caramel no longer containing milk proteins.

The advantage of the invention is consequently demonstrated.

The invention claimed is:

1. A confectionery traditionally made with milk comprising Maillard reacted proteins and reducing carbohydrates, said proteins include at least 0.5% to 30% of pea proteins in dry weight, relative to the total dry weight of the confectionery, and 0.5% to 30% of milk proteins by weight, relative to the total weight of the confectionery, wherein the confectionery traditionally made with milk at least maintains organoleptic properties of a milk only confectionery, wherein the confectionery is selected from the group consisting of soft or hard caramels, toffees and fudges, wherein the residual moisture of said confectionery varies between 3 to 10%.

2. The confectionery according to claim 1, wherein the weight ratio (milk protein)/(pea protein) in said confectionery is between >0 and 2.

3. The confectionery according to claim 1, wherein the confectionery additionally comprises a vegetable fiber.

4. The confectionery according to claim 3, wherein the vegetable fiber comprises branched maltodextrins.

5. The confectionery according to claim 1, wherein the confectionery comprises 1% to 20% of pea proteins in dry weight, relative to the total dry weight of the confectionery.

6. The confectionery according to claim 1, wherein the confectionery comprises 2% to 16% of pea proteins in dry weight, relative to the total dry weight of the confectionery.

7. The confectionery according to claim 1, wherein the confectionery comprises; 0.5 to 20% of milk proteins by weight, relative to the total weight of the confectionery.

8. The confectionery according to claim 1, wherein the B confectionery comprises; 0.5 to 16% of milk proteins by weight, relative to the total weight of the confectionery.

9. The confectionery according to claim 1, wherein the confectionery has a weight ratio of (milk proteins)/(pea proteins) between; 0.016 and 1.

10. The confectionery according to claim 1, wherein the confectionery has a weight ratio of (milk proteins)/(pea proteins) between; 0.016 and 0.5.

11. A confectionery traditionally made with milk comprising Maillard reacted proteins and reducing carbohydrates, said proteins being free from milk protein and include at least 0.5% to 30% of pea proteins in dry weight, relative to the total dry weight of the confectionery, wherein the Maillard reacted confectionery traditionally made with milk at least maintains organoleptic properties of a milk only confectionery, wherein the confectionery is selected from the group consisting of soft or hard caramels, toffees and fudges, wherein the residual moisture of said confectionery varies between 3 to 10%.

* * * * *